(12) United States Patent
Schlemmer et al.

(10) Patent No.: US 9,482,099 B2
(45) Date of Patent: Nov. 1, 2016

(54) ROTOR BLADE FOR A TURBOMACHINE AND TURBOMACHINE

(75) Inventors: Markus Schlemmer, Mainburg (DE); Bartlomiej Pikul, Tarnow (PL)

(73) Assignee: MTU Aero Engines GmbH, Munich (DE)

( * ) Notice: Subject to any disclaimer, the term of this patent is extended or adjusted under 35 U.S.C. 154(b) by 810 days.

(21) Appl. No.: 13/522,258

(22) PCT Filed: Jan. 14, 2011

(86) PCT No.: PCT/DE2011/000031
§ 371 (c)(1),
(2), (4) Date: Jul. 13, 2012

(87) PCT Pub. No.: WO2011/085721
PCT Pub. Date: Jul. 21, 2011

(65) Prior Publication Data
US 2014/0119929 A1    May 1, 2014

(30) Foreign Application Priority Data
Jan. 16, 2010    (DE) .................. 10 2010 004 854

(51) Int. Cl.
*F01D 5/30*    (2006.01)
*F01D 5/16*    (2006.01)
*F01D 5/14*    (2006.01)

(52) U.S. Cl.
CPC .............. *F01D 5/16* (2013.01); *F01D 5/141* (2013.01); *F05D 2250/20* (2013.01); *F05D 2250/26* (2013.01); *F05D 2250/27* (2013.01); *F05D 2250/70* (2013.01); *F05D 2250/712* (2013.01); *F05D 2260/94* (2013.01); *F05D 2260/941* (2013.01); *F05D 2260/96* (2013.01); *Y02T 50/671* (2013.01); *Y02T 50/673* (2013.01)

(58) Field of Classification Search
CPC .... F01D 5/16; F01D 5/141; F05D 2260/941; F05D 2250/20; F05D 2250/27; F05D 2250/26; F05D 2250/712
USPC ........................................ 416/193 A
See application file for complete search history.

(56) References Cited

U.S. PATENT DOCUMENTS 3,902,820 A * 9/1975 Amos ..................... 416/97 R
3,986,793 A   10/1976 Warner et al.
4,019,832 A    4/1977 Salemme et al.
4,182,598 A    1/1980 Nelson
(Continued)

FOREIGN PATENT DOCUMENTS

DE   43 03 137 C2   8/1994
EP   1 688 587 A2   8/2006
(Continued)

OTHER PUBLICATIONS

German Search Report, dated Sep. 3, 2010, 4 pages total.
(Continued)

*Primary Examiner* — Craig Kim
*Assistant Examiner* — Jason Fountain
(74) *Attorney, Agent, or Firm* — Crowell & Moring LLP

(57) ABSTRACT

The invention relates to a blade (2) of a turbomachine, in particular a rotor blade of a gas turbine, which has a variable transition radius (Rv1) in the vicinity of at least one platform overhang (16), and to a turbomachine having at least one such blade (2).

15 Claims, 3 Drawing Sheets

(56) References Cited

U.S. PATENT DOCUMENTS

| | | |
|---|---|---|
| 4,595,340 A | 6/1986 | Klassen et al. |
| 5,435,694 A | 7/1995 | Kray et al. |
| 6,017,186 A | 1/2000 | Hoeger et al. |
| 6,478,539 B1 * | 11/2002 | Trutschel ............... F01D 5/143 415/223 |
| 6,755,986 B2 | 6/2004 | Anding et al. |
| 6,761,536 B1 * | 7/2004 | Bash ..................... F01D 5/18 416/193 A |
| 6,976,826 B2 | 12/2005 | Roy et al. |
| 7,037,078 B2 * | 5/2006 | Soupizon et al. ............ 416/203 |
| 2005/0106025 A1 | 5/2005 | Snook et al. |
| 2007/0031259 A1 | 2/2007 | Dube et al. |
| 2007/0031260 A1 * | 2/2007 | Dube et al. ............... 416/193 A |
| 2007/0148000 A1 * | 6/2007 | Marusko et al. ......... 416/193 A |
| 2007/0177979 A1 | 8/2007 | Hoeger |
| 2009/0087316 A1 | 4/2009 | Mueller |
| 2010/0080708 A1 * | 4/2010 | Gupta .................... F01D 5/143 416/223 A |

FOREIGN PATENT DOCUMENTS

| | | |
|---|---|---|
| EP | 1 731 712 A1 | 12/2006 |
| EP | 1 907 671 B1 | 4/2008 |
| FR | 2 905 413 A1 | 3/2008 |
| JP | 5-44691 A | 2/1993 |
| WO | WO 2007/012590 A1 | 2/2007 |

OTHER PUBLICATIONS

PCT/DE2011/000031 PCT/ISA/210, dated Aug. 24, 2011.

* cited by examiner

ROTOR BLADE FOR A TURBOMACHINE AND TURBOMACHINE

This application claims the priority of International Application No. PCT/DE2011/000031, filed Jan. 14, 2011, and German Patent Document No. 10 2010 004 854.2, filed Jan. 16, 2010, the disclosures of which are expressly incorporated by reference herein.

BACKGROUND AND SUMMARY OF THE INVENTION

The invention relates to a rotor blade and a gas turbine having such a rotor blade.

Blades in steam and/or gas turbines are always subject to high mechanical, chemical and physical loads. As a result, attempts have been made for a long time to improve the rotor blades in particular with respect to their mechanical loading capacity such as stress distribution and resonance behavior. Thus, a rotor blade is shown in U.S. Pat. No. 6,976,826 B2 which is provided on the side of the blade tip with a pocket for accommodating a different material. The different material changes the weight distribution of the blade in the region of the blade tip and causes a change in the vibrational behavior and/or the resonance behavior. However, there is generally a risk that crack-prone edges and/or transitions will develop in the region of pocket, the result of which is that this solution requires expensive manufacturing. Furthermore, the material properties of the different type of material must be precisely defined. U.S. Pat. No. 6,755,986 B2 proposes a recess on the blade-root side to reduce the weight of a rotor blade. However, the disadvantage is that a change in the vibrational behavior and the stress progressions is almost impossible to achieve, because the rotor blade with its blade root and thus the recess are firmly clamped in the rotor. U.S. Pat. No. 4,595,340 shows a rotor blade with a recess on the blade-root side which extends through its platform into the blade pan, thereby making it possible to achieve modified vibrational behavior along with a reduction in weight. However, in this case there is a risk of weakening the blade pan.

In addition, providing single or multiple ribs as well as corresponding material thickenings to reduce vibrations is known in the case of platform overhangs that are elongated in the axial direction. However, these countermeasures mean excess weight, which may lead to cracks in the blade root. Furthermore, turbulence and thus flow losses may develop in particular as a result of the ribs.

The object of the present invention is creating a rotor blade that is optimized in terms of stress and vibrations, and which eliminates the aforementioned disadvantages and is simple to manufacture, as well as a gas turbine having such a rotor blade.

A rotor blade according to the invention for a turbomachine has a blade root for fastening on a rotor, a blade pan and a platform arranged between the blade root and the blade pan, which has at least one platform overhang. According to the invention, the platform overhang is provided with a variable transition radius in the transition area to the platform.

The variable transition radius allows the targeted adjustment of the rotor blade with respect to its vibrational behavior and its stress progressions. It is hereby possible to reduce an elevated stress concentration of the rotor blade in different blade regions and at the same time adjust the vibration on the platform overhang. Because the stress progressions in the rotor blade are taken into consideration or adjusted in a targeted manner, there is no weakening of the rotor blade, rather in fact a strengthening. In other words, the rotor blade according to the invention has an optimized center of gravity and an optimum weight with reduced stress concentration in specific regions with adjusted platform vibration and therefore an increased stiffness. The transition radius is configured directly during manufacturing of the rotor blade so that post-processing of the blade, as with the known filling of the pockets on the blade-tip side, is dispensed with. In addition, no ribs must be formed, which also simplifies manufacturing, for example a casting process. Furthermore, the rotor blade is made only of one material and not of a plurality of materials as is the case with the previously described pocket solution in the region of the blade tip.

In the case of one exemplary embodiment, the variable transition radius is configured on the blade-root side. There is hereby no impact on the flow progressions in the flow channel, in particular when a transition radius of the platform overhang on the blade-pan side is configured to be constant.

An especially effective influence on the vibrational behavior and the stress progressions and therefore the running behavior can be achieved, if the variable transition radius in platform regions with high loads is smaller than in platform regions with low loads. So, for example, in the case of one exemplary embodiment, the transition radius increases in particular in the rotational direction of the rotor. In doing so, the running behavior of the rotor blade can be further optimized if the rotor blade has a transition radius in the region of high loads that is reduced as compared to known rotor blades and a transition radius in the region of low loads that is increased as compared to known rotor blades.

Depending upon the relevant requirements, the transition radius may also be configured to be constant in sections. Thus, the transition radius is configured to be step-like in the case of one variant for example. It may likewise be designed to be constant only on the end side.

In the case in which the rotor blade has a further platform overhang, it may also be used to adjust the running behavior and be provided with a variable transition radius. It may likewise have a constant transition radius. Basically, the design of the transition radii on the platform overhangs depends on the respective requirements and may be selected to be variable. Thus, it is possible to provide different variable transition radii on both platform overhangs or even on only one of the platform overhangs.

A turbomachine according to the invention, in particular a gas turbine, has at least one rotor blade having a variable transition radius on the platform overhang. Such a gas turbine with a plurality of these types of rotor blades is characterized by a high level of running smoothness over its entire rpm range and is therefore suitable for aircraft engines in particular.

Other advantageous exemplary embodiments of the invention are the subject matter of further dependent claims.

A preferred exemplary embodiment of the invention will be explained in greater detail in the following on the basis of schematic representations.

DETAILED DESCRIPTION OF THE DRAWINGS

Figure 1:
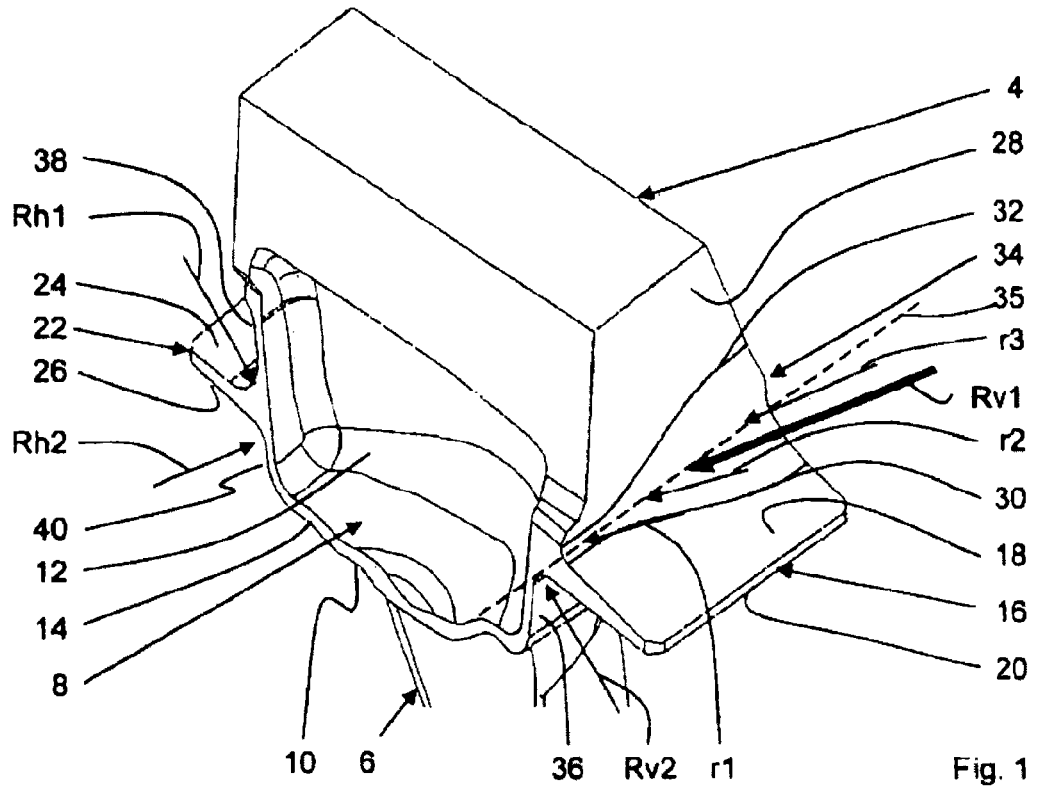
FIG. 1 is a perspective view of a platform region of a first rotor blade according to the invention.

FIG. 1 shows a perspective representation of a blade 2 of a turbomachine from a frog-eye's perspective. The blade 2 is a cast part for example and is designed as a rotor blade of a gas turbine, in particular an aircraft engine. It is depicted as an intermediate product with a blade root 4 for fastening on a rotor, a blade pan 6 and a platform 8 arranged between the blade root 4 and the blade pan 6. The platform 8 has a platform surface 10 facing the blade pan 6. On the blade-root side, the platform 8 is provided with a recess 12 so that the platform surface 10 is formed by a comparatively thin crosspiece 14. In a further processing step, the blade root 4 may be configured to be a Christmas tree root.

The platform 8 is provided in the front region, i.e., the inflow side, with a front platform overhang 16. The platform overhang 16 has a plate-like cross section and has an overhang surface 18 on the blade-root side and an overhang surface 20 on the blade-pan side. In the rear region, i.e., the outflow side, the platform 8 has a rear platform overhang 22 with a plate-like cross section that is offset in the direction of the blade pan 6 and an overhang surface 24 on the blade-root side and an overhang surface 26 on the blade-pan side.

According to the invention, the front overhang surface 18 on the blade-root side merges via a variable transition radius Rv1 into a front blade-root surface 28. The overhang radius Rv1 changes on the pressure side from a small transition radius r1 via an increasing transition radius r2 into a large overhang radius r3 on the suction side so that a tulip-like transition area 34 with an axis of symmetry 35 indicated by variable form lines 30, 32 virtually develops. A more in-depth consideration of the transition radius Rv1 according to the invention follows in FIG. 2.

The transition radius Rv2 in the transition area of the front, blade-pan side, overhang surface 20 to the front platform surface 36 is configured to be constant. The transition radii Rh1, Rh2 of the rear platform overhang 22 in the transition area from the overhang surfaces 24, 26 to the rear blade root surface 38 or to the rear platform surface 40 are configured to be constant. However, all transition radii Rv1, Rv2, Rh1, Rh2 may be configured to be variable (cf. FIGS. 6 to 11).

Figure 2:
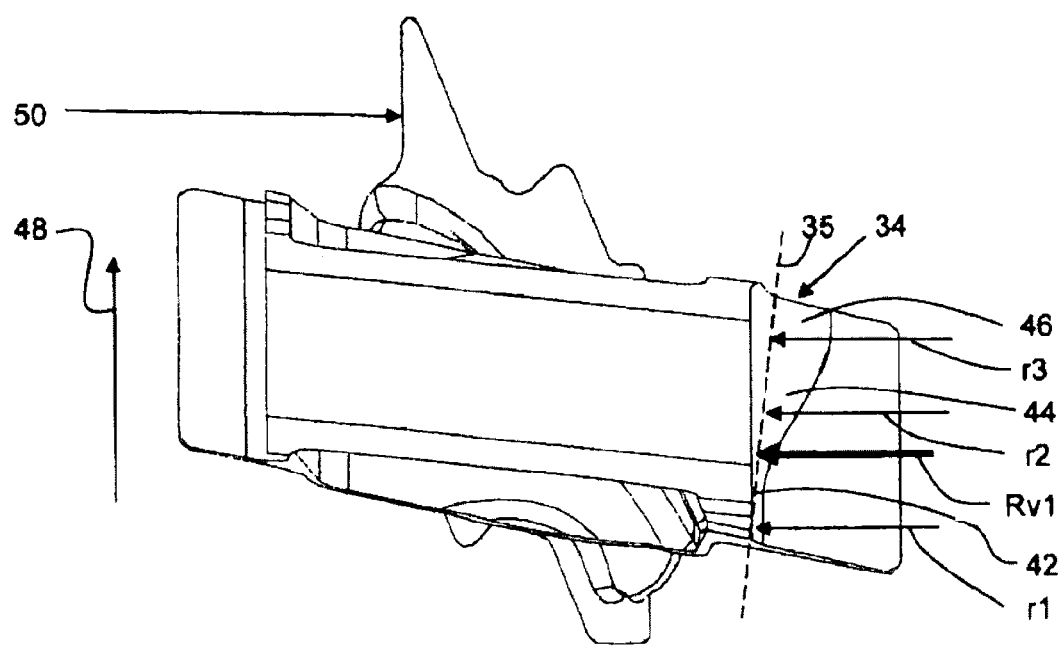
FIG. 2 is a view of the rotor blade from FIG. 1 from a frog-eye's perspective.

According to the depiction in FIG. 2, the transition area 34 can be divided into an end section 42 with the small and constant radius r1, an intermediate section 44 with the increasing radius r2 and in an end section 46 with the large and constant radius r3. Therefore, the transition radius Rv1 has two end sections 42, 46 each having a constant radius r1, r3 and an intermediate section 44 with an increasing radius r2. Viewed in the rotation direction 48 of the rotor (not shown), the transition radius Rv1 therefore increases overall. For example, the small radius r1 is only a few tenths of a millimeter and the large radius r3=8 mm. However, even larger radii are conceivable. According to the invention, the small radius r1 produces in end section 42 a stress reduction and optimization of vibration in regions with high loads and the large radius r3 produces in end section 46 a stress reduction and optimization of vibration in regions with low loads. Therefore, mass is disposed in a targeted manner on the end section 46 with low stress to reduce the vibration and mass is removed on the end section 42 with high stress and, in doing so, the stress is reduced and/or adjusted in an optimized manner on different regions of the rotor blade 2.

For the sake of completeness, a shroud 50 of the rotor blade 2 located on the blade-pan side and visible in FIG. 2 is also mentioned.

Figure 3:
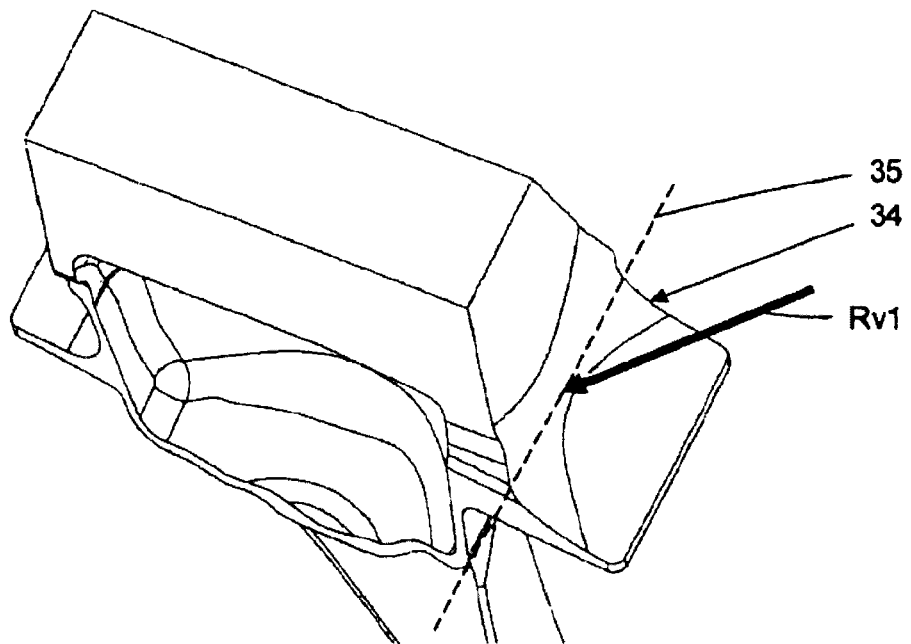
FIG. 3 is a perspective view of a platform region of a second rotor blade according to the invention.
Figure 4:
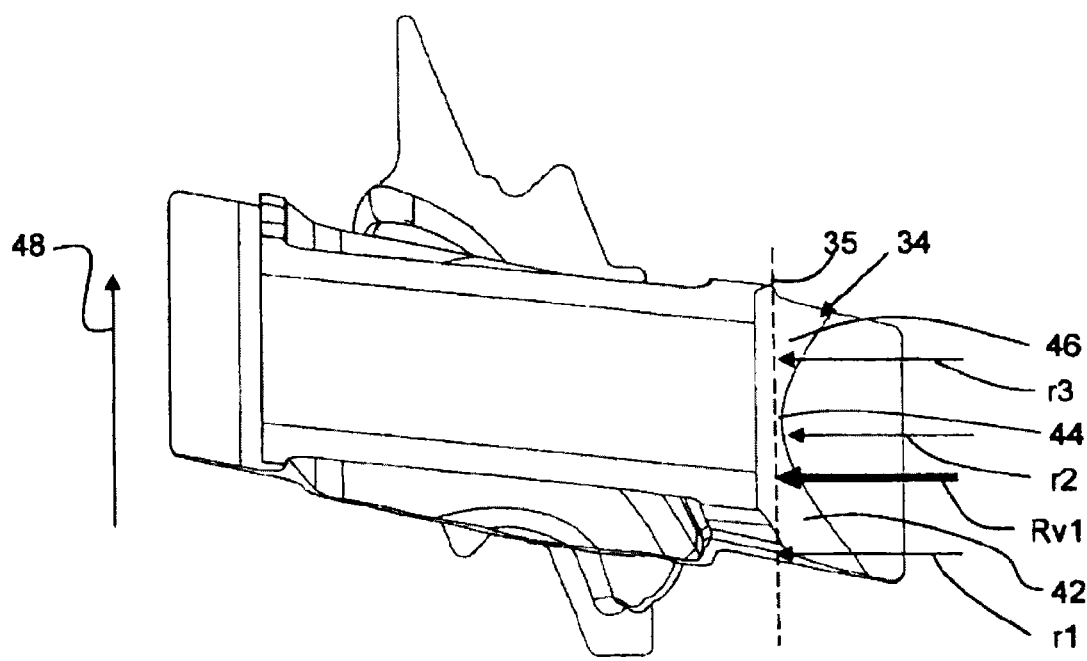
FIG. 4 is a view of the rotor blade from FIG. 3 from a frog-eye's perspective.

FIGS. 3 and 4 show a second exemplary embodiment according to the invention of a rotor blade 2 having at least one variable, front, blade-root side transition radius Rv1, which defines a lower transition area 34 with an axis of symmetry 35. In contrast to the exemplary embodiment described above according to FIGS. 1 and 2, this transition area 34 is formed by two trough-like or arch-like form lines 30, 32, which delimit a narrow intermediate section 44 with a variable radius r2 and two funnel-like or tulip-like end sections 42, 46 with increasing radii r1, r3, wherein the radii r1, r3 increase to the same extent or may be designed to be different.

Figure 5:
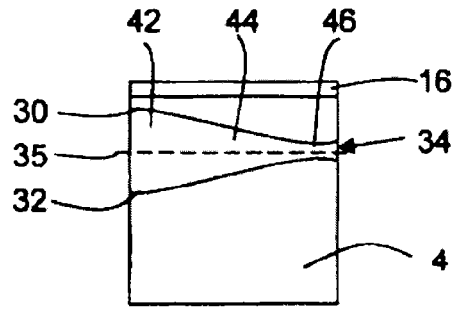
FIG. 5 is a front view of the exemplary embodiment from FIGS. 1 and 2.
Figure 6:
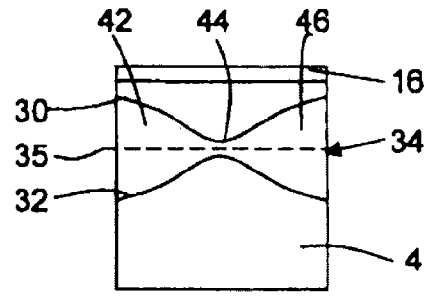
FIG. 6 is a front view of the exemplary embodiment from FIGS. 3 and 4, FIGS. 7 to 10 are front views of additional exemplary embodiments according to the invention.

FIGS. 5 and 6 show highly simplified front views of the rotor blade 2 from FIGS. 1 and 2 or 3 and 4 so that repeated explanations will be dispensed with. For reasons of clarity, the rotor blade 2 is reduced respectively to a schematic blade root 4 and a schematic front platform overhang 16 in FIGS. 5 and 6 as well as in the following FIGS. 7 to 10.

Figure 7:
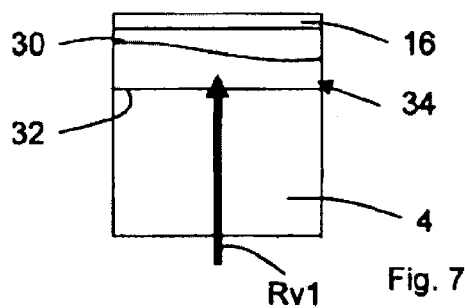

FIGS. 7, 8, 9 and 10 depict additional preferred exemplary embodiments of a rotor blade 2 according to the invention. Thus, FIG. 7 shows a front lower transition area 34 having a variable transition radius Rv1. The transition area 34 is expanded on the suction side and, in contrast to the previously described exemplary embodiments according to FIGS. 1 to 6, configured without an axis of symmetry 35. The transition area 34 has a variable form line 30 on the platform-overhang side and a constant form line 32 running parallel to the platform overhang 16 on the blade-root side.

Figure 8:
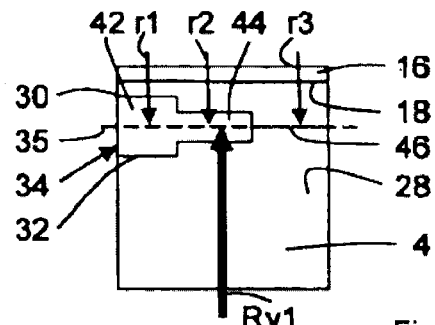

FIG. 8 shows a front lower transition area 34 with an axis of symmetry 35, which is formed by a discrete variable transition radius Rv1, so that step-like form lines 30, 32 develop. The transition radius Rv1 has three sections 42, 44, 46 each having a constant radius r1, r2, r3, wherein the greatest radius r1 is arranged on the suction side and the smallest radius r3 on the pressure side. In the depicted exemplary embodiment, the smallest radius is r3=0 mm so that the front overhang surface 18 on the blade-root side merges on the pressure side without or almost without transition radius Rv1 into the front blade-root surface 28.

Figure 9:
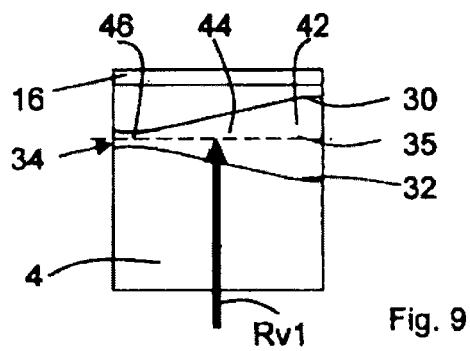

FIG. 9 illustrates, based on the exemplary embodiment described in FIGS. 1, 2 and 5, that it is also conceivable with all exemplary embodiments to configure the transition radius Rv1 to be reduced on the suction side and increased on the pressure side.

Figure 10:
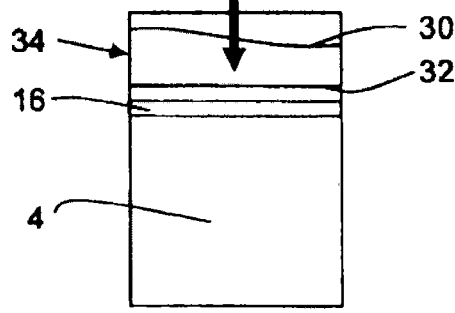

FIG. 10 shows, based on the exemplary embodiment described in FIG. 7, that it is likewise conceivable with all exemplary embodiments to configure a variable transition radius Rv2 on the blade-pan side.

Figure 11:
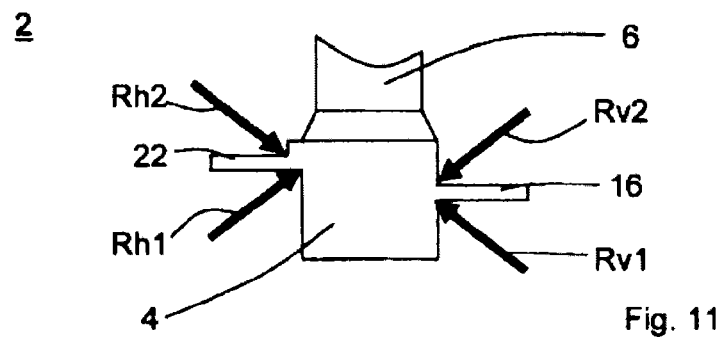
FIG. 11 is a front view of a rotor blade for a summarized clarification of the radii according to the invention.

In summary, reference is made to FIG. 11, which shows a highly simplified lateral depiction of a rotor blade 2 having a blade root 4, a blade pan 6 and two platform overhangs 16, 22, on which the essential transition radii Rv1, Rv2, Rh1, Rh2 are marked. According to the invention, all depicted transition radii Rv1, Rv2, Rh1, Rh2 may be designed to be variable separately or in combination and have reduced or increased radii r1, r2, r3 on both the suction side as well as the pressure side.

A blade 2 of a turbomachine is disclosed, in particular a rotor blade of a gas turbine, which has a variable transition radius Rv1 in the vicinity of at least one platform overhang 16, and a turbomachine having at least one such blade 2.

The invention claimed is:
1. A rotor blade for a turbomachine, comprising:
a blade root;
a blade pan;
a platform, wherein the platform is disposed between the blade root and the blade pan; and
a platform overhang disposed on the platform, wherein the platform overhang has a variable transition radius in a transition area to the platform;
wherein the variable transition radius has a step-like configuration.
2. A rotor blade for a turbomachine, comprising:
a blade root;
a blade pan;
a platform, wherein the platform is disposed between the blade root and the blade pan;
a first platform overhang disposed on the platform; and
a second platform overhang disposed on the platform;
wherein the first platform overhang has a first variable transition radius in a first transition area to the platform;
wherein the second platform overhang has a second variable transition radius in a second transition area to the platform;
wherein one of the transition areas is divided into a first end section with a small transition radius, a second end section with a large transition radius, and an intermediate section with a transition radius that increases from the first end section to the second end section; and
wherein the second variable transition radius of the second platform overhang includes a constant transition radius.

3. The rotor blade according to claim 2, wherein at least one of the variable transition radii is disposed on a blade-root side of the platform.
4. The rotor blade according to claim 2, wherein at least one of the variable transition radii, in a region of the platform with a high load, is smaller than in a region of the platform with a low load.
5. The rotor blade according to claim 2, wherein the intermediate section transition radius increases in a direction of rotation of the rotor blade.
6. The rotor blade according to claim 2, wherein the first variable transition radius is a minimum in a region of the platform with a high load.
7. The rotor blade according to claim 2, wherein the first variable transition radius is a maximum in a region of the platform with a low load.
8. The rotor blade according to claim 2, wherein the small and large transition radii are constant.
9. The rotor blade according to claim 2, wherein a blade pan side transition area between the blade pan and one of the first and second platform overhangs has a constant transition radius.
10. The rotor blade according to claim 2, wherein the at least one of the transition areas has plural variable transition radii.
11. The rotor blade according to claim 2, further comprising a further variable transition radius disposed on a blade root side of one of the first and second platform overhangs.
12. The rotor blade according to claim 2, wherein the small transition radius is in a region of the platform opposed from a direction of rotation of the rotor blade.
13. The rotor blade according to claim 2, wherein the large transition radius is in a region of the platform in a direction of rotation of the rotor blade.
14. A turbomachine, comprising:
a rotor blade according to claim 2.
15. The turbomachine according to claim 14, wherein the turbomachine is a gas turbine aircraft engine.

* * * * *